United States Patent Office 3,712,870
Patented Jan. 23, 1973

3,712,870
POLYMERIZATION
David G. Guillot, Pequannock, N.J., assignor to
Uniroyal, Inc., New York, N.Y.
Filed Oct. 14, 1970, Ser. No. 80,799
Int. Cl. C08g 23/14
U.S. Cl. 260—2 A     5 Claims

ABSTRACT OF THE DISCLOSURE

A catalytic composition which is the reaction product of an organometallic compound and an aminopolyol, the polymerization of an epoxide compound with such catalytic composition, and the epoxide polymer obtained therefrom.

---

This invention relates to a new and improved catalyst for polymerizing epoxide compounds.

More specifically, this invention teaches the use of a catalyst prepared by reacting an organometallic compound, such as diphenylmagnesium, with an aminopolyol, as hereinafter defined.

The catalysts of the invention are particularly useful because high conversions to high molecular weight polymers may be obtained, at moderate temperatures.

The product obtained is largely steroregular, having very little amorphous polymer with some catalysts of the invention, whereas other catalysts of the invention produce more amorphous polymer. The product has minimal amounts of low molecular weight cyclic oligomers; and, because low catalyst levels may be used, has only small amounts of catalyst residue.

Another advantage of the catalyst is that diarylmagnesium (especially diphenylmagnesium) can be used to give high molecular weight polymers similar to those obtained with dialkylmagnesium. (Others have not been able to do this with diphenylmagnesium.)

Still further advantages of the catalyst are its ease of preparation, stability, and tolerance of halogen compounds.

The organometallic catalysts which can be employed in the polymerization reaction are characterized by the formula shown below:

R—M—R′ wherein M is a Group II or III metal of the Periodic Table, e.g., magnesium, zinc, aluminum, calcium, cadmium, strontium, gallium, and barium; and wherein R is any hydrocarbon radical, e.g., alkyl, aryl, alkenyl, cycloalkenyl, cycloalkyl aryl, aralkyl, alkaryl, and cycloalkyl and R′ is same as R or H, —OR, —NR₂, —SR. It is preferred that R and R′ contain from 1 to 14 carbon atoms. In addition, R′ can be halogen such as chlorine, bromine, iodine, and fluorine. Typical R and R′ radicals include, among others, methyl, ethyl, propyl, n-butyl, isobutyl, 2-ethylhexyl, dodecyl, octadecyl, phenyl, tolyl, xylyl, phenylethyl, phenylpropyl, phenylbutyl, benzyl, cyclopentyl, cyclohexyl, cycloheptyl, 3-propylcyclohexyl.

The dialkyl and trialkyl metals and diaryl metals are eminently suitable as catalysts for the novel process described herein. Dialkyl and diaryl magnesium, dialkylzine and trialkyl aluminum are especially preferred catalyst subclasses.

Illustrative examples of organometallic catalysts that are contemplated include, for instance, dimethylmagnesium, diethylmagnesium, dipropylmagnesium, diisopropylmagnesium, dibutylmagnesium, diisobutylmagnesium, di-n-octylmegnesium, diphenylmagnesium, di-p-tolylmagnesium, di-o-tolylmagnesum, dithienylmagnesium, ethylmagnesium iodide, diethylzinc, dipropylzinc, dibutylzinc, dioctadecylzinc, butylzinc chloride, butylzinc bromide, octylzinc chloride, diphenylzinc, di-o-tolylzinc, trimethylgallium, triethylgallium, triphenylgallium, diisoamylcadmium, dipropylcadmium, diethylcadmium, dicyclohexylzinc and triisopropylaluminum.

The organomagnesium compounds may be prepared by the common procedures. Especially useful is the organomagnesium compounds prepared in chlorobenzene according to U.S. Pat. 3,264,360 or prepared by transmetallation of the corresponding organomercury compound in an ether solvent. High purity materials should be used in all cases.

The aminopolyol is a 2-amino-1,3-propanedial or a 3-amino-1,2-propanediol corresponding to one of the general formulas:

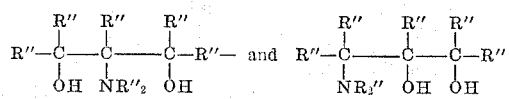

where R″ is hydrogen; an alkyl group having 1 to 12 carbon atoms; an aryl group having 1 to 4 rings; or a substituted alkyl or aryl group wherein the substituents are selected from hydroxyl, halo, phenyl, halophenyl, and alkoxy and alkylthio containing 1 to 6 carbon atoms. Examples of the substituents are methyl, ethyl, propyl, butyl, isobutyl, pentyl, benzyl, phenyl, chlorophenyl, alkylphenyl, cyclohexyl, cyclopentyl, 2-chloromethyl-2-propyl, methylthio, thienyl, hydroxyethyl, methoxy, ethoxy, chlorine, bromine, iodine and fluorine. The R″ groups may be the same or different.

Exemplary of the aminopolyols are:

3-amino-1,2-propanediol
3-amino-2-methyl-1,2-propanediol
3-amino-1,2-butanediol
1-amino-2,3-butanediol
3-amino-1,2-pentanediol
2-o-tolyl-3-amino-1,2-propanediol
4-o-tolyl-3-amino-1,2-butanediol
4-p-tolyl-3-amino-1,2-butanediol
4-m-tolyl-3-amino-1,2-butanediol
3-N-methylamino-1,2-propanediol
3-N,N-dimethylamino-1,2-propanediol
3-N,N-diethylamino-1,2-propanediol
3-N-ethylamino-1,2-propanediol
3-N,N-diisobutylamino-1,2-propanediol
3-N-cyclohexylamino-1,2-propanediol
1-phenyl-3-amino-1,2-propanediol
2-amino-1,3-propanediol
2-amino-2-methyl-1,3-propanediol
2-amino-2-ethyl-1,3-propanediol
2-amino-2-propyl-1,3-propanediol
2-amino-2-isopropyl-1,3-propanediol
2-amino-2-isopropyl-1,3-propanediol
2-amino-2-butyl-1,3-propanediol
2-amino-2-pentyl-1,3-propanediol
2-amino-2-benzyl-1,3-propanediol
2-amino-2-phenyl-1,3-propanediol
2-amino-2-p-tolyl-1,3-propanediol
2-amino-2-α-thienyl-1,3-propanediol
2-amino-2-(2-chloromethyl-2-propyl)-1,3-propanediol
2-amino-1,3-butanediol
2-amino-1,3-pentanediol
1-phenyl-2-amino-1,3-propanediol
2-amino-1-p-tolyl-1,3-propanediol
2-amino-1-m-tolyl-1,3-propanediol
2-amino-1-o-tolyl-1,3-propanediol
2-amino-1-α-thienyl-1,3-propanediol
2-amino-1-methylthio-1,3-propanediol
2-amino-4-phenyl-1,3-butanediol 2-N-methylamino-1,3-propanediol
2-N,N-dimethylamino-1,3-propanediol
2-N,N-diethylamino-1,3-propanediol
2-N,N-diisopropylamino-1,3-propanediol
2-N-methylamino-2-methyl-1,3-propanediol
2-N-methylamino-2-ethyl-1,3-propanediol
2-N,N-dimethylamino-2-methyl-1,3-propanediol
2-N,N-diethylamino-2-methyl-1,3-propanediol
2-N,N-dimethylamino-2-ethyl-1,3-propanediol
2-N,N-diethylamino-2-ethyl-1,3-propanediol
2-N,N-diethylamino-1-phenyl-1,3-propanediol
2-amino-2-ethyl-1-phenyl-1,3-propanediol
2-amino-2-methoxyethyl-1,3-propanediol
2-amino-2-ethoxyethyl-1,3-propanediol
2-amino-1-(p-methoxyphenyl)-1,3-propanediol
2-amino-1-(o-ethoxyphenyl)-1,3-propanediol
2-amino-1-(α-naphthyl)1,3-propanediol
2-amino-2-(p-bromophenyl)-1,3-propanediol
2-amino-2-(p-iodophenyl)-1,3-propanediol
2-amino-1-(m-fluorophenyl)-1,3-propanediol
2,2-bis(hydroxymethyl)-2,2'2''-nitrilotriethanol
2-hydroxymethyl-2,2',2''-nitrilotriethanol
2-hydroxymethyl-2,2',2''-nitrilotri-1-propanol
2-ethyl-2-hydroxymethyl-2,2',2''-nitrilotriethanol
2',2''-dimethyl-2-ethyl-2-hydroxymethyl-2,2',2''-nitrilotriethanol
1-hydroxymethyl-2,2',2''-nitrilotriethanol
2',2''-dimethyl-1-hydroxymethyl-2,2',2''-nitrilotriethanol
2-hydroxymethyl-1-phenyl-2,2',2''-nitrilotriethanol
2-amino-2-hydroxymethyl-1,3-propanediol
2-ethyl-2-hydroxymethyl-2,2'-iminodiethanol
2-hydroxymethyl-2,2'-iminodiethanol
1-hydroxymethyl-2,2'-iminodiethanol
1-(2-piperidyl)-1,2-ethanediol
1-N-piperidino-2,3-propanediol
2-benzyl-3-amino-1,2-propanediol
2-phenyl-3-amino-1,2-propanediol
4-phenyl-3-amino-1,2-butanediol
2-o-chlorophenyl-3-amino-1,2-propanediol The catalyst of this invention is prepared by reacting the organomagnesium compound with the aminopolyol. In order to obtain uniform reaction, it is desirable to dissolve the aminopolyol, which is frequently a viscous liquid or a crystalline solid, in a solvent. Suitable solvents for the aminopolyols that may be used in the preparation of the catalyst include ethers such as diethyl ether, dioxane, or tetrahydrofuran, amines, and the epoxide that is to be polymerized.

The amount of solvent is not critical. The minimum amount is in general limited by the solubility of the aminopolyol.

The amount of oragnomagnesium compound reacted with the aminopolyol to give active catalyst should be such that some carbon-magnesium bonds remain unreacted. The amount should be within the range of from about 0.9 to about 20 mole-equivalent of organomagnesium per mole-equivalent of aminopolyol (considering all amino groups non-reactive) and preferably in the range of 1.0 to 3.0. If insufficient organomagnesium compound is added, an inactive mixture results which can be activated by adding additional organomagnesium to obtain the desired ratio.

The temperature during the preparation of the catalyst should be within the range —80° to 150° C. and preferably 0°–60° C. The reaction is exothermic but usually sufficient solvent is present so that the temperature rise with no external cooling is only a few degrees. Pressure is not critical, atmospheric pressure of slightly above in an inert atmosphere being commonly used.

Any epoxide containing a single oxirane ring may be homopolymerized, or copolymerized with a second such epoxide, by the process of this invention. Outstanding results are obtained with ethylene oxide and monosubstituted ethylene oxides.

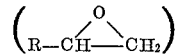

where R is a hydrocarbon radical such as alkyl, aryl, cycloalkyl, which may contain functional groups non-reactive with the catalyst. Exemplary of the epoxides that may be homopolymerized or copolymerized are the alkylene oxides, such as ethylene oxide, propylene oxide, 1,2-butylene oxide, 2,3-butylene oxide, isobutylene oxide, 1,2-hexene oxide, 1,2-octylene oxide; and substituted alkylene oxides, for example, cyclohexene oxide, styrene oxide; glycidyl ethers, such as methyl glycidyl ether, ethyl glycidyl ether, hexyl glycidyl ether, phenyl glycidyl ether, o,m, or p-tolyl glycidyl ether, o,m, or p-chlorophenyl glycidyl ether; and unsaturated epoxides, such as, vinyl cyclohexene monoxide, butadiene monoxide, methallyl glycidyl ether, o-, m-, or p, allylphenyl glycidyl ether, and allyl glycidyl ether. Halogen-containing epoxides may also be polymerized by this process and are particularly important in the preparation of copolymers of alkylene oxides. Exemplary of such halogen-containing epoxides that may be so polymerized or copolymerized are epichlorohydrin, epibromohydrin, epifluorohydrin, trifluoromethyl ethylene oxide. Other compounds include amino epoxides, such as, 3-dimethylamino-1,2-epoxypropane
3-diethylamino-1,2-epoxypropane
3-benzylmethylamino-1,2-epoxypropane
o-, m-, or p-dimethylaminophenyl glycidyl ether;
o-, m-, or p-diethylaminophenyl glycidyl ether;

acetal- and ketal-containing epoxides, such as, 1,1-dimethoxy-2,3-epoxypropane,
1,1-diethoxy-2,3-epoxypropane, 2-(2,3-epoxypropoxy)-tetrahydropyran;
glycidyl ethers of 4-hydroxymethyl-1,3-dioxolanes;
silane-containing epoxides, such as, glycidoxypropyl trimethoxysilane;

sulfone-containing epoxides, such as, 7-oxa-3-thiabicyclo[4.1.0]heptane 3,3-dioxide; and nitrile-containing epoxides, such as β-cyanoethyl glycidyl ether.

The amount of catalyst used to polymerize the epoxides depends in part on the monomer, monomer purity and diluent purity. Less pure materials require more catalyst. In general, the catalyst will be in the range of about 0.001 to 10 mole-percent calculated as magnesium and based on moles of the monomer or monomers being polymerized and preferably will be within the range of from about 0.02 to 2.0 mole-percent.

The temperature of the reaction should be within the range—80° to 150° C. and preferably 0–60° C. Pressure is not critical, atmospheric pressure or slightly above being commonly used.

The polymerizations should be carried out in suitable apparatus that has been thoroughly cleaned, dried and flushed with oxygen-free inert gas. Two general procedures have been used. The catalyst can be prepared by dissolving the aminopolyol in a solvent such as tetrahydrofuran and then adding a solution of the organomagnesium compound. The resulting relatively stable catalyst mixture is then added to a solution of monomer in solvent and agitated at room temperature until polymerization is complete. The second method is to dissolve the aminopolyol in monomer, add solvent, then add the solution of organomagnesium compound and allow the polymerization to proceed at room temperature or slightly above.

It is also desirable in some cases to dilute the polymerization mixture with an inert solvent. For this purpose a wide variety of solvents may be used. Especially useful are aromatic hydrocarbons, aliphatic hydrocarbons, cycloaliphatic hydrocarbons, ethers, amines and chlorinated solvents. When polymerizing ethylene oxide sufficient solvent is important to ensure adequate cooling so as to prevent an excessive increase in pressure in the reactor.

The following examples more fully illustrate the practice of the instant invention.

EXAMPLES 1–3

The following three examples show the high conversions that can be obtained when polymerizing propylene oxide in various solvents.

In each of the examples a polymerization vessel filled with nitrogen was charged with the 2-amino-2-ethyl-1,3-propanediol and the propylene oxide. After the aminodiol completely dissolved in the monomer, the solvent and the diphenylmagnesium solution in tetrahydrofuran were charged. Polymerization started immediately and the mixtures were agitated at room temperature until no further polymerization was taking place (18 hrs. or longer).

The poly(propylene oxide) produced was isolated by evaporation of the solvents under reduced pressure. The quantities of each reagent and results are given in Table I.

TABLE II

| Ex. | Propylene oxide, grams | Toluene, ml. | Catalyst mixture, ml. | Time, hours | Yield, grams | Percent conversion | I.V. |
|---|---|---|---|---|---|---|---|
| 5 | 30.5 | 50 | 18 | 1 | 18.6 | 61 | 13.1 |
| 6 | 31.3 | 50 | 18 | 5 | 24.4 | 78 | 13.0 |

These examples show that the polymerization of propylene oxide with my organomagnesium catalyst is rapid at room temperature especially during the first half of the polymerization.

EXAMPLE 7

This example shows the high conversion that can be obtained when polymerizing ethylene oxide.

The polymerization of ethylene oxide was carried out by the procedure of Examples 5–6. To a solution of 29.9 g. of ethylene oxide in 100 ml. of heptane were added 3.1 ml. of a catalyst mixture prepared from diphenylmagnesium and 2-amino-1,3-propanediol as in Examples 5–6. When the polymerization was complete, the granular polymer was separated from the solvent and dried in a vacuum oven. The conversion was 22.5 or 75% of high

TABLE I

| Ex. | Propylene oxide, ml. | Solvent | 2-amino-2-ethyl-1,3-propanediol, ml. | Diphenyl-magnesium in THF | Yield of polymer, grams | Percent conversion | I.V.[1] |
|---|---|---|---|---|---|---|---|
| 1 | 40 | 31 ml. benzene | 0.12 | 6.3 ml. (.28M) | 29.2 | 90 | 8.4 |
| 2 | 12 | 100 ml. toluene | 0.19 | 9 ml. (.30M) | 9.2 | 100 | 7.2 |
| 3 | 40 | 31 ml. penetane | 0.19 | 9 ml. (.3M) | 29.0 | 90 | 15.5 |

[1] Intrinsic viscosities, unless otherwise noted, were run at 60° C. in toluene.

The examples demonstrate the high conversions and relatively large amounts of highly crystalline polymer per gram of diphenylmagnesium obtained with the catalyst in various hydrocarbon solvents.

EXAMPLE 4

This example shows the rapid rate of polymerization of ethylene oxide using the organomagnesium catalyst.

In the polymerization vessel were placed 0.72 ml. of 2-amino-2-ethyl-1,3-propanediol, 350 ml. of benezne and 131.7 g. of ethylene oxide. After a homogeneous solution was obtained, 36 ml. of 0.28 M diphenylmagnesium in tetrahydrofuran were added. The polymerization started immediately and after 10 minutes the vessel was opened and the polymerization stopped by exposure to air. Isolation by the procedure of examples 1–3 gave 60.4 g. (46% conversion) of high molecular weight, crystalline poly(ethylene oxide).

This example shows the significant conversion (46%) that can be obtained in 10 minutes using the organomagnesium catalyst.

EXAMPLES 5–6

The following examples show the rapid rate of polymerization of propylene oxide using the organomagnesium catalyst.

The catalyst mixture used in Examples 5 and 6 was prepared as follows: 0.38 ml. of 2-amino-2-ethyl-1,3-propanediol were dissolved in 20 ml. of tetrahydrofuran, then 18 ml. of 0.3 M diphenylmagnesium in tetrahydrofuran was added. The catalyst was aged 30 minutes at room temperature before use in the polymerization.

The polymerizations were carried out at room temperature by adding the catalyst to a solution of propylene oxide in toluene. The polymers were isolated after the time indicated by the procedure in Examples 1–3.

molecular weight poly(ethylene oxide), I.V. (water, 30°)=5.1.

This example shows that high conversion of ethylene oxide can be obtained using only a small amount of the diphenylmagnesium-2-amino-2-ethyl - 1,3 - propanediol catalyst.

EXAMPLE 8

This example shows that the presence of tetrahydrofuran or other ethers is not necessary to obtain good results with organomagnesium catalysts.

A polymerization vessel filled with nitrogen was charged with 0.19 ml. of 2-amino-2-ethyl-1,3-propanediol, 40 ml. of propylene oxide and 30 ml. of toluene. After the aminodiol completely dissolved, 22 ml. of 0.121 M diphenylmagnesium in benzene (ether free) was added. The mixture was agitated at room temperature until no further polymerization was taking place. Evaporation of the solvents under reduced pressure gave a quantitative yield of high molecular weight poly(propylene oxide).

This example shows that no ether is necessary to obtain a highly active catalyst from organomagnesium compounds.

EXAMPLE 9

This example shows that good results can be obtained with the diphenylmagnesium in benzene in the presence of tetrahydrofuran for comparison with Example 8.

The catalyst mixture used in this example was prepared by adding 22 ml. of 0.121 M diphenylmagnesium in benzene (ether free) to a solution of 0.19 ml. of 2-amino-2-ethyl-1,3-propanediol in 10 ml. of tetrahydrofuran and aging 30 minutes at room temperature. The polymerization was carried out at room temperature by adding the catalyst to a solution of 40 ml. of propylene oxide in 37 ml. of toluene. The polymer was isolated by evaporating the solvents in a vacuum oven. A 97% conversion to high molecular weight poly(propylene oxide), I.V., 5.9. was obtained. This shows that tetrahydrofuran is an inert solvent for the polymerization.

EXAMPLES 10 TO 15

These examples show the results using various aminopolyols with diphenylmagnesium for polymerizing propylene oxide.

In each of these examples 40 ml. of propylene oxide were polymerized and the polymer isolated by the procedure of Examples 1–3. The diphenylmagnesium solution in tetrahydrofuran was 0.3 M (9 ml.). Thirty-one milliliters of solvent were used. Other details and results are given in Table III.

TABLE III

| Example | Catalyst Solvent | Coreactant (molar ratio) | Percent conversion | I.V. | Crystallinity |
|---|---|---|---|---|---|
| 10 | Tetrahydrofuran | 0.155 g. 3-amino-1,2-propanediol (6.7) | 32 | [1] 8.1 | High. |
| 11 | Toluene | 0.18 ml. 3-dimethyl-amino-1,2-propanediol (.67) | 34 | 7.0 | Do. |
| 12 | do | 0.22 ml. 3-diethyl-amino-1,2-propanediol (.67) | 28 | 12.0 | Do. |
| 13 | do | 0.22 ml. 3-diethanol-amino-1,2-propanediol (.33) | 78 | 7.5 | Do. |
| 14 | do | 0.15 ml. 2-amino-1,3-propanediol (.67) | 25 | 4.5 | Do. |
| 15 | Benzene | 0.18 g. 2-amino-2-methyl-1,3-propanediol (.67) | 35 | [1] 8.9 | Do. |

[1] Toluene 30°.

The results show that there are considerable differences depending on the compounds used with diphenylmagnesium to prepare the catalyst. All give poly(propylene oxide) with high crystallinity and high molecular weight. The conversions vary considerably with the structure of the compound.

EXAMPLES 16 and 17

In each of these examples 40 ml. of propylene oxide were polymerized and the polymer isolated by the procedure of Examples 1–3. The compound was dissolved in 10 ml. of tetrahydrofuran or dioxane prior to adding the 0.3 M (9 ml.) diphenylmagnesium in tetrahydrofuran. Other details and results are given in Table IV.

TABLE IV

| Example | Catalyst Solvent | Coreactant (molar ratio) | Percent conversion | I.V. | Crystallinity |
|---|---|---|---|---|---|
| 16 | 50 ml. toluene plus 10 ml. tetrahydrofuran | L-(+)-threo-1-phenyl-2-amino-1,3-propanediol, 0.30 g. (.67) | 100 | 9.1 | High. |
| 17 | 40 ml. toluene plus 10 ml. dioxane | 0.19 ml. 2-amino-2-ethyl-1,3-propanediol (.67) | 100 | 12.4 | Do. |

The results show that outstanding conversions are obtained with 2-amino-2-ethyl-1,3-propanediol and 1-phenyl-2-amino-1,3-propanediol.

EXAMPLES 18–21

These examples show the differences obtained by varying the organomagnesium compound used to prepare the catalyst.

In these examples the organomagnesium solution was prepared from the corresponding organomercury compound in tetrahydrofuran. The polymerization and isolation of polymer was carried out by the procedure of Examples 5–6. In each case 40 ml. of propylene oxide in 50 ml. of toluene were polymerized at room temperature. The catalyst was prepared by reacting the organomagnesium solution in tetrahydrofuran with 0.19 ml. of 2-amino-2-ethyl-1,3-propanediol in 10 ml. of tetrahydrofuran in each example except Example 20 where only 5 ml. of tetrahydrofuran was used. Results are given in Table V.

This example shows that dialkylmagnesium compounds give equally high conversions and high molecular weight polymer as diarylmagnesium compounds.

EXAMPLE 22

This example shows the results obtained with an organoaluminum compound and an aminopolyol.

The catalyst mixture was prepared by dissolving 2.0 ml. of 2-amino-2-ethyl-1,3-propanediol in 10 ml. of tetrahydrofuran and then adding 18.6 ml. of a 20% solution of triisobutylaluminum in heptane and aging 30 minutes at room temperature.

The polymerization was carried out at room temperature by adding 19.7 ml. of the catalyst mixture to a solution of 40 ml. of propylene oxide in 50 ml. of toluene. After the polymerization was complete the polymer was isolated by washing with dilute hydrochloric acid and drying. An amorphous polymer of I.V. 9.5 was obtained in 58% conversion.

This example shows that organoaluminum compounds can be used with aminopolyols to polymerize propylene oxide to high molecular weight polymer. The aminopolyol gives much higher molecular weight polymer than usual with organoaluminum compounds.

EXAMPLE 23

This example shows the results obtained with an organozinc compound and an aminopolyol.

The catalyst mixture was prepared by dissolving 1.26 ml. of 2-amino-2-ethyl-1,3-propanediol in 10 ml. of dioxane, then adding 20 ml. of toluene and 11.7 ml. of 1.5 M diethylzinc in toluene. To the well mixed catalyst was added 42 ml. of propylene oxide. The polymerization mixture was heated at 50° C. until polymerization was complete. The polymer was isolated as in Example 22. A polymer with high crystallinity and I.V. 1.75 was obtained in 23.5% conversion.

The example shows that organozinc compounds can be used with aminopolyols to polymerize propylene oxide.

EXAMPLE 24

This example shows the effect of phenylmagnesium chloride on the polymerization of propylene oxide.

The diphenylmagnesium used in this example was prepared from diphenylmercury containing 5% of phenylmercuric chloride by transmetallation with magnesium turnings in tetrahydrofuran solvent.

TABLE V

| Example | Catalyst Organomagnesium | Conc. | Coreactant | Percent Conversion | I.V. | Crystallinity |
|---|---|---|---|---|---|---|
| 18 | 8 ml. di-n-butyl magnesium | 0.33M | 0.19 ml. 2-amino-2-ethyl1,3-propanediol | 100 | 11.5 | High. |
| 19 | 8 ml. diisopropylmagnesium | 0.37M | 0.19 ml. 2-amino-2-ethyl-1,3-propanediol | 100 | 15.0 | Do. |
| 20 | 9 ml. di-p-tolylmagnesium | 0.3M | 0.19 ml. 2-amino-2-ethyl-1,3-propanediol | 54 | 13.6 | Do. |
| 21 | 10 ml. di-o-thienylmagnesium | 0.3M | 0.19 ml. 2-amino-2-ethyl-1,3-propanediol | 11.6 | | Do. |

The catalyst mixture was prepared by adding 9 ml. of the above 0.3 M diphenylmagnesium solution to a solution of 0.19 ml. of 2-amino-2-ethyl-1,3-propanediol in 5 ml. of tetrahydrofuran and aging 30 minutes at room temperature. The polymerization was carried out at room temperature by mixing the catalyst mixture with 50 ml. of toluene and 40 ml. of propylene oxide. Isolation gave a 96% conversion of high molecular weight (I.V.=15.0), amorphous poly(propylene oxide).

This example shows that organomagnesium halide can be present in the catalyst mixture without reducing the activity of the catalyst. The organomagnesium chloride addition is one effective method of reducing the crystallinity of the poly (propylene oxide) obtained.

EXAMPLES 25a-d

This example was designed to show approximately the optimum ratio of the diphenylmagnesium-2-amino-2-ethyl-1,3-propanediol catalyst.

The polymerization of propylene oxide and isolation of the polymer was carried out by the procedure of Examples 5-6 using the proportions given in Table VI. The ratio is the ratio of moles of 2-amino-2-ethyl-1,3-propanediol to moles of diphenylmagnesium.

This example shows that the most effective ratio lies between 1:1 and 1:2. Excessive diphenylmagnesium reduces the conversion.

TABLE VI

| | Example | | | |
|---|---|---|---|---|
| | 25a | 25b | 25c | 25d |
| Ratio | 1:1 | 1:2 | 1:2 | 1:3 |
| 2-amino-2-ethyl-1,3-propanediol, ml | 0.19 | 0.19 | 0.101 | 0.10 |
| Tetrahydrofuran, ml | 10 | | | |
| Dioxane, ml | | 10 | 10 | 10 |
| Diphenylmagnesium (.3M), ml | 5.65 | 11.3 | 6.0 | 9.0 |
| Toluene, ml | 25 | 40 | 40 | 40 |
| Propylene oxide, ml | 40 | 40 | 40 | 40 |
| Conversion, percent | 0 | 76 | 89 | 21 |
| I.V. (Toluene 60°) | | 8.6 | 11.1 | 7.3 |
| Crystallinity | | High | High | High |

EXAMPLES 26a-d

This example was designed to show that the diphenylmagnesium-2-amino-2-ethyl-1,3-propanediol catalyst is stable for several days.

The catalyst was prepared by reacting together a solution of 0.85 ml. of 2-amino-2-ethyl-1,3-propanediol in 45 ml. of dioxane with 41 ml. of 0.3 M diphenylmagnesium in tetrahydrofuran at 0° C. The catalyst mixture was stored at approximately 0° until used to polymerize a solution of 40 ml. of propylene oxide in 40 ml. of toluene by the procedure of Examples 5-6. Table VII gives the results.

The example shows that the catalyst is stable at 0° for at least 72 hours.

TABLE VII

| | Example | | | |
|---|---|---|---|---|
| | 26a | 26b | 26c | 26d |
| Storage time at 0° C., hrs | 1 | 24 | 48 | 72 |
| Amount of catalyst mixture, ml | 19 | 19 | 19 | 19 |
| Percent conversion | 88 | 100 | 100 | 99 |
| I.V. (Toluene 60°) | 15.5 | 16.3 | 11.5 | 11.6 |
| Crystallinity | High | High | Medium | Low |

EXAMPLE 27

This example shows that the organomagnesium-2-amino-2-ethyl-1,3-propanediol catalyst is useful in copolymerizing propylene oxide with an unsaturated epoxide.

The catalyst was prepared by reacting a solution of 0.19 ml. of 2-amino-2-ethyl-1,3-propanediol in 10 ml. of tetrahydrofuran with 9 ml. of 0.33 M di-n-butylmagnesium in tetrahydrofuran at room temperature.

A solution of 40 ml. of propylene oxide and 4.0 ml. of allyl glycidyl ether in 50 ml. of toluene was polymerized with the catalyst by the procedure of Examples 5-6. A 100% conversion of high molecular weight amorphous copolymer was obtained.

The example shows that the catalyst is useful in preparing copolymers of propylene oxide with unsaturated epoxides to give polymers with unsaturation for curing.

EXAMPLE 28

This example shows the high stereoregularity of the poly(propylene oxide) obtained using the organomagnesium aminopolyol catalysts.

Samples of poly(propylene oxide) prepared in Examples 12 and 14 and one prepared similar to Example 17 were compared for solubility and amount of swell in acetone as a relative measure of stereoregularity. The results are given below. The swell value is the ratio of weight of the swollen polymer sample and the dried polymer.

TABLE VIII

| | Percent insoluble at— | | Swell value at— | |
|---|---|---|---|---|
| | 0° C. | 25° C. | 0° C. | 25° C. |
| Polymer from example 12 | | 89 | | 4.8 |
| Polymer from example 14 | | 98 | | 3.9 |
| Polymer similar to example 17 | 99 | 95 | 2.1 | 4.3 |

Having thus described my invention, what I claim and desire to protect by Letters Patent is:

1. In a process for polymerizing at least one epoxide compound which contains a single oxirane group and wherein the reaction is carried out in an inert solvent at a temperature of from −80° to 150° C., the improvement of performing the reaction in the presence of from 0.001 to 10 mole percent, based on the ratio of organometallic compound to monomer, of a catalyst which is prepared by reacting 0.9 to 20 moles of an organometallic compound selected from diarylmagnesium, dialkylmagnesium, dithienylmagnesium, trialkylaluminum, dialkylzinc, and arylmagnesium chloride, with one mole of an aminopolyol having the formula:

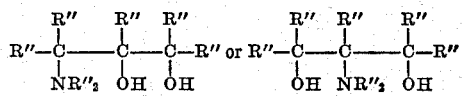

wherein R″ is hydrogen, an alkyl group having 1 to 12 carbon atoms, an aryl group having 1 to 4 rings, or a hydroxyalkyl group provided that R″ attached to N is hydrogen or alkyl.

2. The process of claim 1 wherein the epoxide compound is an alkylene oxide having from 1 to 10 carbon atoms.

3. The process of claim 1 wherein the alkylene oxide is ethylene oxide.

4. The process of claim 1 wherein the alkylene oxide is propylene oxide.

5. The process of claim 1 wherein the solvent is tetrahydrofuran, dioxane, benzene, petane or toluene.

References Cited

UNITED STATES PATENTS

| 3,135,706 | 6/1964 | Vanderberg | 260—2 |
| 3,337,475 | 8/1967 | Fukui et al. | 260—2 |
| 3,415,761 | 12/1968 | Vandenberg | 260—2 |
| 3,598,765 | 8/1971 | Achon | 260—2 EP |

OTHER REFERENCES

Chemical Abstracts 67, 64736K (1967).

WILLIAM, SHORT, Primary Examiner

E. A. NIELSEN, Assistant Examiner

U.S. Cl. X.R.

252—431 N; 260—2 S, 47 EP, 79, 88.3 A

UNITED STATES PATENT OFFICE
CERTIFICATE OF CORRECTION

Patent No. 3,712,870          Dated January 23, 1973

Inventor(s) DAVID G. GUILLOT

It is certified that error appears in the above-identified patent and that said Letters Patent are hereby corrected as shown below:

Column 1, line 63, change "dialkylzine" to --dialkylzinc--.
" 1, line 70, change "di-n-octylmegnesium" to --di-n-octylmagnesium--.

Column 2, line 13, change "propanedial" to --propanediol--.

Column 7, in Table III, Example 10, change "6.7" to --.67--.

Column 8, line 38, change "ganozine" to --ganozinc--.

Column 9, in Table VI, under the heading "25c", change "0.101" to --0.10--.

Column 10, line 57 (in Claim 5), change "petane" to --pentane--.

Signed and sealed this 20th day of November 1973.

(SEAL)
Attest:

EDWARD M. FLETCHER, JR.
Attesting Officer

RENE D. TEGTMEYER
Acting Commissioner of Patents